April 16, 1968  A. NAWIJN  3,378,388

METHOD FOR MANUFACTURING FLUORESCENT X-RAY SCREENS

Filed Sept. 17, 1965

INVENTOR
Arjen Nawijn
BY
Wenderoth, Lind & Ponack
ATTORNEYS 3,378,388
METHOD FOR MANUFACTURING FLUORESCENT X-RAY SCREENS Arjen Nawijn, Delft, Netherlands, assignor to N.V. Optische Industrie de Oude Delft, Delft, Netherlands
Continuation-in-part of application Ser. No. 206,607, July 2, 1962. This application Sept. 17, 1965, Ser. No. 488,227
Claims priority, application Netherlands, July 20, 1961, 267,329
4 Claims. (Cl. 117—7)

This application is a continuation-in-part of the application Ser. No. 206,607, filed July 2, 1962, by the present applicant jointly with Martinus Pieter Visser, entitled, "Fluorescent Image Screen and Method for Manufacturing Such a Screen."

The invention relates to the manufacture of fluorescent screens and, more specifically, to a method of manufacturing flat X-ray fluorescent screens for use in radiofluorographic cameras or in X-ray image intensifier devices of the type comprising an optical system for projecting the X-ray image formed on a fluorescent screen onto the photocathode of an electronic image intensifier tube.

The optical system used in such X-ray cameras and devices are generally of externally high luminosity in order to reduce as much as possible the X-ray dose required to obtain a sufficient exposure of the photographic film or a sufficient brightness of the fluoroscopic image. As is well-known, the depth of field of optical objectives of high relative aperture is very small. It is therefore essential that the X-ray screen conforms exactly to the object plane on which the objective is focused and that the flatness of the screen be as good as possible. Even deviations from these conditions in the order of fractions of a millimeter may result in poor resolution of the photograph or the photocathode image.

In the application Ser. No. 206,607 mentioned above it has been proposed to meet the condition of screen flatness by providing a screen consisting of a soft elastic X-ray pervious membrane that carries a layer of fluorescent material and is held in flat stretched condition by a rigid supporting frame. The frame is preferably formed by a pair of coaxial rings between which the edge of the elastic membrane is clamped. In manufacturing such a screen the fluorescent layer can be applied to the stretched membrane by the well-known technique of sedimentation. According to that method a column of liquid containing particles of the fluorescent material homogeneously dispersed therein is maintained over the membrane so as to allow the particles to precipitate and form a layer on the membrane.

I have found that in the sedimentation process use can be made of the elastic properties of the membrane to produce in a simple manner a screen having a characteristic that is often found very desirable in photofluorographic cameras and optical X-ray image intensifiers. A well-known phenomenon occurring in optical imagery systems is that of vignetting, i.e. the reduction in effective cross-section of oblique beams compared to the axial beam which results in a considerably lower illumination of image points near the border of the image. It has been proposed heretofore, in the case of optical X-ray devices, but compensate for the vignetting effect by the use of an X-ray screen that exhibits a gradual increase of the thickness of the fluorescent layer from the center towards the edge of the screen. Since the efficiency of the conversion of X-rays into light by a fluorescent layer is generally improved by increasing the layer thickness the edge portions of the X-ray image on such a screen will appear brighter than the center portion and a more evenly illuminated picture may result in the final stages of the apparatus. However, it has not been possible heretofore to devise a simple and workable method and means to produce the desired gradual increase in fluorescent layer thickness.

It is, accordingly, the principal object of the present invention to provide a method for manufacturing a flat X-ray fluorescent screen for use in optical X-ray devices, which has a gradually increasing thickness of the fluorescent layer from the center towards the edges and is thereby capable of compensating for the vignetting caused by optical systems used in conjunction with such screens.

The invention broadly comprises the characteristic steps of stretching an elastic membrane on a rigid supporting frame, positioning the frame so that the stretched membrane is in a horizontal plane, applying pressure to the stretched membrane to thereby cause the same to bulge upwards, applying to the membrane a column of liquid containing particles of a fluorescent material for sedimentation onto the upper side of the membrane, and removing said pressure after sedimentation is completed.

The invention will be described in detail hereinafter, reference being had to the drawings in which.

Figure 1:
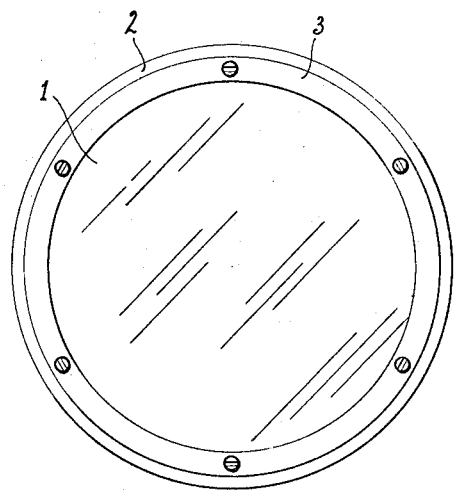
FIG. 1 is a front view of the structure of a rigid supporting frame and a membrane stretched across the frame.
Figure 2:
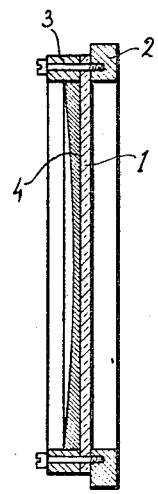
FIG. 2 is a cross-sectional view of a screen made in accordance with the invention.

In FIGS. 1 and 2 a membrane 1 is shown consisting of an elastic material which is as pervious to X-rays and/or light rays as possible. Materials that are sufficiently pervious to X-rays or light rays (depending on whether the phosphor layer will be applied to the side of the membrane facing the optical objective or on the side facing the X-ray tube, respectively) and have sufficient elasticity and tensile strength are commercially available. Due to their elasticity and tensile strength certain plastic films are particularly suitable for this purpose. As an example a polyethylene terephthalate film known under the trademark "Melinex" may be mentioned which I have found to give good results in a thickness between 0.05 and 0.5 mm. depending upon the diameter of the screen. Melinex films of such thickness are perfectly transparent and colorless and do not absorb X-rays to a noticeable degree.

The membrane 1 is stretched tightly in all directions on an annular supporting frame 2. This can be done e.g. by pinching a piece of film which is slightly larger than the screen to be produced at several points of its circumference and stretching it as evenly as possible in all directions, after which the annular frame 2 is laid upon the membrane and attached thereto by the aid of a suitable glue. The remaining margin of the membrane can be removed after that. A ring 3 attached by means of some screws to the supporting frame 2 may be used to prevent loosening of the glue joint. It will be evident that, alternatively, the membrane 1 could only have been pinched along its edge between two rings of sufficient rigidity instead of being glued to the ring 2.

Figure 3:
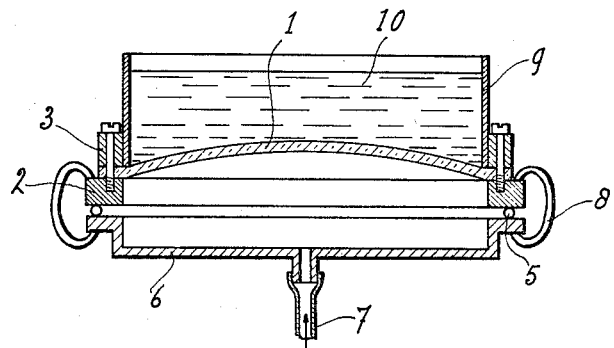
FIG. 3 is a cross-sectional view of an arrangement preferably used in practicing the method.

To the membrane 1 a fluorescent layer 4 of varying thickness is applied by means of the arrangement shown in FIG. 3. The supporting frame 2 is laid with the membrane in horizontal position upon the edge of a pressure basin 6, an O-ring being inserted between the two and heavy blade springs 8 being applied to form a fluid tight seal for the basin 6. When a pressurized medium, which conveniently may be compressed air, is admitted under the membrane through a pipe 7 the membrane will bulge upwards due to the excess pressure.

Upon the membrane a ring 9 is placed defining a space into which a liquid 10 is poured out in which the desired fluorescent material has been dispersed homogeneously. The height of the liquid column gradually increases from the center towards the edge of the screen. By leaving the liquid undisturbed for some time the fluorescent material is allowed to precipitate and a layer is formed on the membrane whose thickness varies proportionally to the local height of the liquid column. After the sedimentation is completed the excess pressure is removed so that the membrane returns to its flat condition, and the screen is completed in the conventional manner by sucking off the excess liquid and drying the screen.

It is to be understood that in the drawing various dimensions, such as the thickness of the membrane and the fluorescent layer, the pitch of the membrane and the height of the liquid column, have been exaggerated for the sake of clarity. For instance, in a certain case, I use a Melinex film 0.075 mm. thick for a screen of approximately 12½ inch diameter, and I give the membrane a pitch of 8 mm. and apply a liquid column of approximately 5 mm. over the top of the membrane in order to obtain a variation of fluorescent layer thickness roughly in the ratio of 1:2½.

Although the kind of variation of fluorescent layer thickness that can be achieved by curving the elastic membrane during sedimentation by means of fluid pressure appears very satisfactory to compensate for the vignetting of most optical systems, it will be evident that mechanical means such as a suitable gauge can be used able to press the membrane to any desired shape in order to meet special requirements.

If the membrane is to be used on the X-ray side a reflective backing for the fluorescent layer is preferably provided by applying a thin, elastic coating of a suitable material, such as a plastic glue containing titanium dioxyde, onto the membrane prior to sedimentation. In addition, such an intermediate coating may improve the affixture of the fluorescent layer to the supporting structure.

What I claim is:

1. A method for manufacturing a fluorescent X-ray screen comprising the steps of:

stretching an elastic membrane on a rigid supporting frame;

positioning said frame so that the stretched membrane is in a horizontal plane;

applying pressure to said stretched membrane to thereby cause the same to bulge upwards;

applying to said membrane a column of liquid containing particles of a fluorescent material for sedimentation onto the upper side of said membrane;

and removing said pressure after sedimentation is completed to allow the coated membrane to return to a flat condition.

2. A method for manufacturing a fluorescent X-ray screen comprising the steps of:

stretching an elastic membrane on a rigid supporting frame;

positioning said frame so that said membrane is in a horizontal plane;

applying a difference in fluid pressure on both sides of said membrane to thereby cause said membrane to bulge upwards;

applying to said membrane a column of liquid containing particles of a fluorescent material for sedimentation onto the upper side of said membrane;

and removing said difference in fluid pressure after sedimentation is completed to allow the coated membrane to return to a flat condition.

3. A method as claimed in claim 2 wherein said difference in fluid pressure is applied by admitting a pressurized fluid into a sealed space the top wall of which is formed by said membrane.

4. A method as claimed in claim 1 wherein prior to the sedimentation a reflective intermediate coating is applied to said membrane.

References Cited

UNITED STATES PATENTS

| | | | |
|---|---|---|---|
| 2,836,101 | 5/1958 | De Swast | 350—193 X |
| 2,726,167 | 12/1955 | Emmens | 117—33.5 |
| 2,695,964 | 11/1954 | Schepker | 250—71 |
| 2,459,693 | 1/1949 | Gordon | 250—71 |

ALFRED L. LEAVITT, *Primary Examiner.*

A. M. GRIMALDI, *Assistant Examiner.*